(12) United States Patent
Iwamatsu et al.

(10) Patent No.: US 10,003,711 B2
(45) Date of Patent: Jun. 19, 2018

(54) LIGHT IRRADIATION DEVICE, IMAGE READING DEVICE, AND IMAGE FORMING APPARATUS

(71) Applicants: Akihiro Iwamatsu, Kanagawa (JP); Kazushige Kawamura, Kanagawa (JP); Takuya Kohda, Kanagawa (JP)

(72) Inventors: Akihiro Iwamatsu, Kanagawa (JP); Kazushige Kawamura, Kanagawa (JP); Takuya Kohda, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days. days.

(21) Appl. No.: 15/451,561

(22) Filed: Mar. 7, 2017

(65) Prior Publication Data

US 2017/0264770 A1 Sep. 14, 2017

(30) Foreign Application Priority Data

Mar. 9, 2016 (JP) ................................ 2016-045569

(51) Int. Cl.
*H04N 1/04* (2006.01)
*H04N 1/028* (2006.01)

(52) U.S. Cl.
CPC ....... *H04N 1/02835* (2013.01); *H04N 1/0284* (2013.01); *H04N 1/02895* (2013.01);
(Continued)

(58) Field of Classification Search
CPC ........... H04N 1/02835; H04N 1/02855; H04N 1/02865; A61B 1/00059; A61B 1/05; A61B 1/0638; A61B 1/0646; A61M 2205/051; G01J 3/0208; G01J 3/0216; G01J 3/0291; G01J 3/10; G01N 2021/8663; G01N 21/86
See application file for complete search history.

(56) References Cited

U.S. PATENT DOCUMENTS 5,408,263 A * 4/1995 Kikuchi ............. A61B 1/00059
348/223.1
5,684,908 A * 11/1997 Kross ..................... G02B 6/032
385/125

(Continued)

FOREIGN PATENT DOCUMENTS

JP 2010-130056 6/2010
JP 2012-249093 12/2012

*Primary Examiner* — Negussie Worku
(74) *Attorney, Agent, or Firm* — Oblon, McClelland, Maier & Neustadt, L.L.P.

(57) ABSTRACT

A light irradiation device includes a light source, a light guide member, and a holding member. The light guide member includes an incident surface, an exit surface, and a held surface. The incident surface has an elongated shape in a main scanning direction and faces a light emitting surface of the light source. The light guide member includes a securing structure in each of both end portions in the main scanning direction, which are out of a light guide area of the light guide member. The securing structure in one end portion is an engagement lug structure protruding to penetrate into a through-hole of the holding member, including a lug on a leading end, and engaging the holding member. The securing structure on another end portion is a fastening structure having a fastening hole penetrated with a fastening member and being secured to the holding member with the fastening member.

7 Claims, 8 Drawing Sheets (52) U.S. Cl.
CPC ........... *H04N 2201/0081* (2013.01); *H04N 2201/02462* (2013.01); *H04N 2201/02468* (2013.01); *H04N 2201/02485* (2013.01)

(56) References Cited

U.S. PATENT DOCUMENTS

| | | | | |
|---|---|---|---|---|
| 6,479,812 B2 * | 11/2002 | Tabata | ................ | G02B 6/0001 |
| | | | | 250/239 |
| 8,558,072 B1 * | 10/2013 | Streit | ..................... | A01H 5/10 |
| | | | | 435/415 |
| 8,982,431 B2 * | 3/2015 | Mitsutake | ........... | G02B 6/0091 |
| | | | | 358/475 |
| 9,316,782 B2 * | 4/2016 | Chen | .................... | G02B 6/0091 |
| 9,329,333 B2 * | 5/2016 | Fujiuchi | ............ | H04N 1/02825 |
| 9,478,090 B2 * | 10/2016 | Shimoda | ................ | G01N 21/86 |
| 2005/0083449 A1 * | 4/2005 | Morsch | .............. | A47L 15/4293 |
| | | | | 349/58 |
| 2009/0316224 A1 | 12/2009 | Kawamura et al. | | |
| 2009/0316225 A1 | 12/2009 | Fujioka et al. | | |
| 2010/0129116 A1 | 5/2010 | Shinkawa | | |
| 2011/0157660 A1 * | 6/2011 | Higashitani | ........ | G03G 15/0409 |
| | | | | 358/474 |
| 2013/0141766 A1 | 6/2013 | Iwamatsu et al. | | |
| 2013/0222865 A1 * | 8/2013 | Iwamatsu | ............ | G02B 6/0051 |
| | | | | 358/484 |
| 2014/0111835 A1 * | 4/2014 | Ozawa | .................. | H04N 1/028 |
| | | | | 358/475 |
| 2014/0233077 A1 | 8/2014 | Iwamatsu et al. | | |
| 2014/0268254 A1 | 9/2014 | Iwamatsu et al. | | |
| 2015/0062668 A1 | 3/2015 | Iwamatsu et al. | | |
| 2016/0134775 A1 | 5/2016 | Iwamatsu | | |

\* cited by examiner

LIGHT IRRADIATION DEVICE, IMAGE READING DEVICE, AND IMAGE FORMING APPARATUS

CROSS-REFERENCE TO RELATED APPLICATIONS

This patent application is based on and claims priority pursuant to 35 U.S.C. § 119(a) to Japanese Patent Application No. 2016-045569, filed on Mar. 9, 2016, in the Japan Patent Office, the entire disclosure of which is hereby incorporated by reference herein.

BACKGROUND

Technical Field

Embodiments of the present disclosure relate to a light irradiation device, an image reading device, and an image forming apparatus.

Related Art

Recently, in an image reading device, such as a scanner device, disposed in, e.g., a facsimile machine, a copier, or a multifunction peripheral, there is demand for enhancement of start-up speed, energy saving, light extension, and the like, and a light irradiation device (an original-document lighting device) using a light emitting diode (LED) being a point light source is employed as a light source.

Recent advancement of LED technologies has enabled manufacturing of brighter LEDs, and such a brighter LED can be mounted on a scanner having a high reading rate that requires high illuminance on the surface of original document.

When an illumination system includes an LED having a light emitting surface which is small to be regarded as a point light source, the light intensity may be low, resulting in a non-uniform illuminance distribution in a sub-scanning direction. Hence, in an original-document lighting device using an LED as the light source, a light guide member guiding light from the LED is adopted. In an image reading device in which high image quality is required, it is necessary to optimize the light source such as the LED and the light guide member, to efficiently concentrate light, and to obtain a uniform illuminance distribution. In addition, high light utilization efficiency is preferable for cost reduction.

To enhance the light utilization efficiency, light is preferably concentrated on a read center by the light guide member. As the light guide member, for example, a light guide member including a transparent material, such as a transparent resin including polymethyl methacrylate (PMMA), is used. From the viewpoint of cost reduction, the light guide member is usually manufactured by injection molding which is excellent in mass productivity and is low in cost.

For example, a technology of sandwiching the light guide member is proposed as a light irradiation device allowing an irradiation area to be efficiently irradiated with light.

SUMMARY

In an aspect of the disclosure, there is provided a light irradiation device that includes a light source, a light guide member, and a holding member. The light source is an elongated light source or a plurality of light emitting elements linearly arranged in a main scanning direction on a board. The light guide member includes a transparent material to guide light from the light source. The holding member holds the light source and the light guide member. The light guide member includes an incident surface, an exit surface, and a held surface. The light exiting from the light source is incident on the incident surface. The incident surface has an elongated shape in the main scanning direction and is disposed to face a light emitting surface of the light source. The light incident from the incident surface is to exit from the exit surface toward an irradiation area of an irradiation target. The held surface is disposed in contact with the holding member to be pressed against and secured to the holding member. The light guide member includes a securing structure in each of both end portions in the main scanning direction, which are out of a light guide area of the light guide member. The securing structure in one end portion is an engagement lug structure protruding to penetrate into a through-hole of the holding member, including a lug on a leading end, and engaging the holding member. The securing structure on another end portion is a fastening structure having a fastening hole penetrated with a fastening member and being secured to the holding member with the fastening member.

In another aspect of the disclosure, there is provided an image reading device that includes the light irradiation device and an image pick-up element. The light irradiation device irradiates an irradiation target with light. The image pick-up element converts a light intensity of reflection light from the irradiation target into an image signal to read an image of the irradiation target.

In still another aspect of the disclosure, there is provided an image forming apparatus that includes the image reading device and an image forming unit to form, on a medium, the image read by the image reading device.

BRIEF DESCRIPTION OF THE SEVERAL VIEWS OF THE DRAWINGS

The aforementioned and other aspects, features, and advantages of the present disclosure would be better understood by reference to the following detailed description when considered in connection with the accompanying drawings, wherein.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

Although the embodiments are described with technical limitations with reference to the attached drawings, such description is not intended to limit the scope of the disclosure and all of the components or elements described in the embodiments of this disclosure are not necessarily indispensable.

Referring now to the drawings, embodiments of the present disclosure are described below. In the drawings for explaining the following embodiments, the same reference codes are allocated to elements (members or components) having the same function or shape and redundant descriptions thereof are omitted below.

For a light irradiation device, there is demand for higher illuminance with a recent request for increasing productivity (reading speed). To meet the demand, for example, the current supplied to the LED or the number of integrated LEDs may be increased. However, such countermeasures may increase the amount of heat generated from the LED(s), thus thermally expanding a light guide member near the LED(s). Consequently, deformation, such as bending and flexure, may arise in the light guide member.

Hence, according to at least one embodiment of the present disclosure, a light irradiation device can position a light guide member at high accuracy and facilitate assembling of the light guide member even if the light guide member is deformed.

Hereinafter, a light irradiation device, an image reading device, and an image forming apparatus according to embodiments of the present disclosure will be described with reference to the drawings. Embodiments of the present disclosure are not limited to the embodiments described below, but changes, such as other embodiments, additions, corrections, and deletions, can be made within a scope which can be conceived by the person skilled in the art, and the changes are included in the scope of the present disclosure insofar as the function and the effect of the present disclosure are obtained in any aspect.

Image Forming Apparatus

An image forming apparatus according to an embodiment of the present disclosure includes an image reading device described below, and forms an image read by the image reading device on a predetermined sheet. The image reading device includes a light irradiation device described below, irradiates an irradiation target with light by the light irradiation device, converts light intensity of reflection light from the irradiation target into an image signal, and thus, reads the image of the irradiation target.

Figure 1:
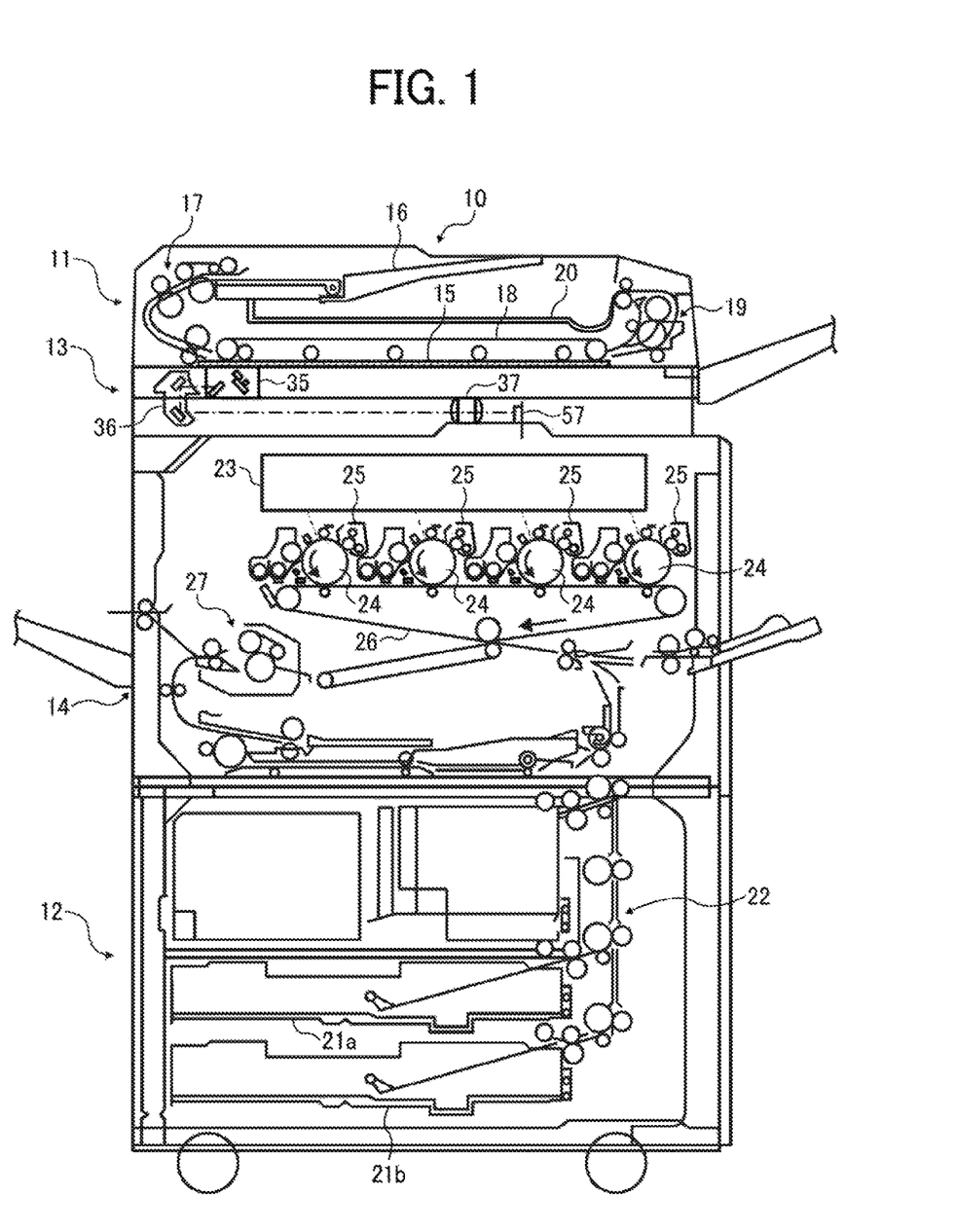
FIG. 1 is a schematic view of a configuration of an image forming apparatus.

FIG. 1 is a diagram illustrating an image forming apparatus including a light irradiation device according to an embodiment of the present disclosure, and illustrates an example in which the image forming apparatus is applied to an electrophotographic copier 10. Examples of the copier include a full-color copier forming an image by using a general electrostatic imaging method, a copier forming a monochromatic image, or the like. For example, an ink jet method or the like can be used as an imaging method, in addition to the electrophotographic method.

The copier 10 includes an automatic document feeder 11, a sheet feeding unit 12, an image reading unit (an image reading device) 13, and an image forming unit (an image forming device) 14.

The automatic document feeder 11 conveys an original document placed on a document tray 16 onto exposure glass 15 by a separation feeder 17 including various rollers such as a sheet feeding roller or a separation roller, discharges the original document of which the image reading is finished from the exposure glass 15 as a transparent member by a conveyance belt 18, and then, ejects the original document to an ejection tray 20 by a sheet ejection unit 19 including various ejection rollers.

In a case where both surfaces of the original-document are read, the original document is returned onto the exposure glass 15 by a switching mechanism provided on the sheet ejection unit 19 and the conveyance belt 18, and an unread surface is read.

The sheet feeding unit 12 includes sheet feed cassettes 21a and 21b to contain recording sheets as recording mediums having different sizes, and a sheet feeder 22 including various rollers which convey the recording sheet contained in the sheet feed cassettes 21a and 21b up to a transfer position.

The image reading device 13 is described below in detail, and the image reading device 13 drives a first carriage 35 and a second carriage 36 in a right-left direction (a sub-scanning direction) in FIG. 5, irradiates an original document surface with light from a light source, reads the original document surface, and reflects reading light on a mirror, and then, receives the reflected reading light in an image reading sensor such as a charge-coupled device (CCD) by a lens unit 37.

The image forming unit 14 includes an exposure device 23 forming a writing signal on the basis of a reading signal which is received in the lens unit, a plurality of photoconductor drums 24 on which the writing signal generated by the exposure device 23 is formed, a developing device 25 filled with toners of each color of cyan, magenta, yellow, and black, supplying the toners of different colors to each of the photoconductor drums 24, and visualizing the writing signal, a transfer belt 26 on which a color image is formed by transferring a visible image on the photoconductor drum 24 in superposition and which transfers the color image onto a recording sheet fed from the sheet feeding unit 12, and a fixing device 27 fixing the color image transferred onto the recording sheet onto the recording sheet.

Image Reading Device

Figure 2:
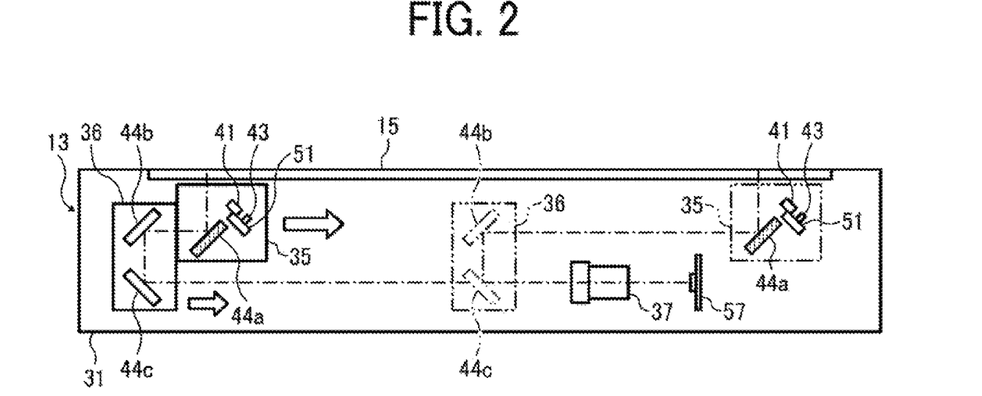
FIG. 2 is a schematic view of a configuration of a part of an image reading device.

FIG. 2 is a diagram illustrating an image reading device including the light irradiation device according to an embodiment of the present disclosure. The image reading device 13 includes the exposure glass 15, a body frame 31, the first carriage 35, the second carriage 36, the lens unit 37, and an image pick-up element 57, and further includes a drive rail, a pulley, a motor, a wire, and a structure holding such components.

The first carriage 35 includes a light-irradiation optical system including a light emitting diode (hereinafter, referred to as an LED) 43 as a light emitting element, a board 51 on which the LED is mounted, and a light guide member 41 including a transparent material, and a reflection mirror 44*a*. The second carriage 36 includes two reflection mirrors 44*b* and 44*c*.

Each component (the LED 43, the board 51, and the light guide member 41) of the light-irradiation optical system, each of the reflection mirrors 44*a*, 44*b*, and 44*c*, and the image pick-up element 57 are arranged to have an elongated shape in a perpendicular direction in FIG. 2 or are continuously arranged. The direction will be referred to as a main scanning direction.

An original document of a reading target is held on the exposure glass 15. The light-irradiation optical system irradiates an original document surface of the reading target with light in the main scanning direction, reflection light from an irradiation area is reflected on each of the reflection mirrors and is incident on the lens unit 37, and concentration of light and image formation are performed on the image pick-up element 57. Thus, linear image data is acquired. Planar image data is obtained by continuously acquiring linear image data by being moved in the perpendicular direction with respect to the main scanning direction, on the original document surface of the reading target. At this time, a movement direction will be referred to as the sub-scanning direction.

In the image reading device 13 illustrated in FIG. 2, the planar image data can be obtained by moving the first carriage 35, and excellent image data free from a blur can be obtained by moving the second carriage 36 such that a distance between the original document surface, and the lens unit 37 and the image pick-up element 57 is not changed.

Light Irradiation Device

A light irradiation device according to an embodiment of the present disclosure includes a light source, a light guide member including a transparent material to guide light from the light source, and a holding member to hold the light source and the light guide member. The light source is an elongated light source or a plurality of light emitting elements linearly arranged in a main scanning direction on a board. The light guide member includes an incident surface, an exit surface, and a held surface. Light exiting from the light source is incident on the incident surface. The incident surface has an elongated shape in the main scanning direction and is disposed to face a light emitting surface of the light source. The light incident from the incident surface is to exit toward an irradiation area of an irradiation target. The held surface is disposed in contact with the holding member to be pressed against and secured to the holding member. The light guide member includes a securing structure in each of both end portions in the main scanning direction, which are out of a light guide area of the light guide member. The securing structure in one end portion is an engagement lug structure protruding to penetrate into a through-hole of the holding member, including a lug on a leading end, and engaging the holding member. The securing structure in the other end portion is a fastening structure including a fastening hole penetrated with a fastening member and being secured to the holding member with the fastening member.

Figure 3:
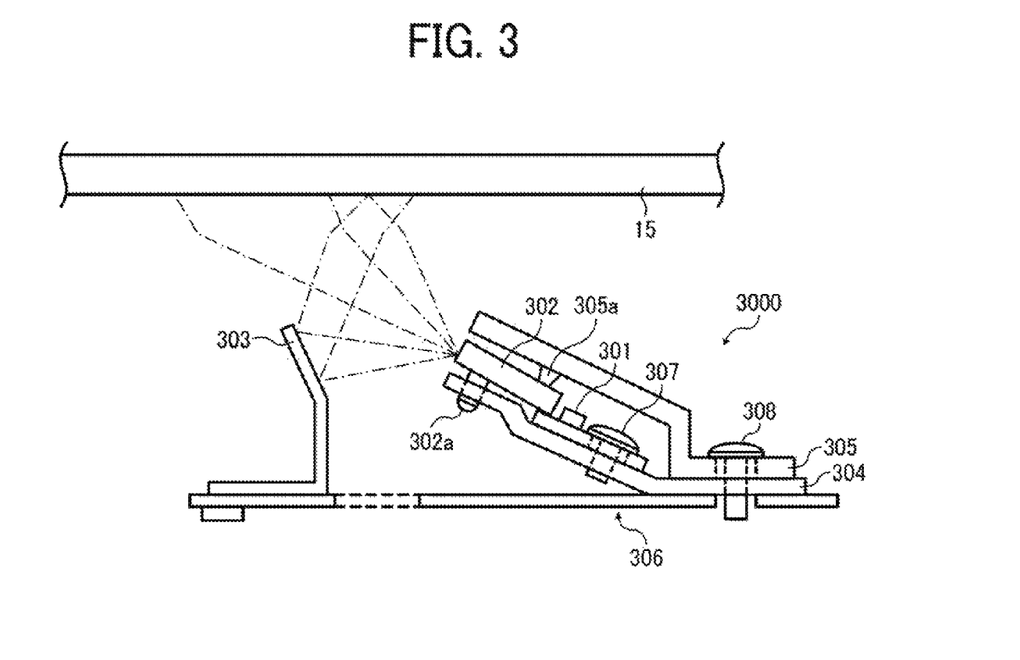
FIG. 3 is a cross-sectional view illustrating a comparative example of a light irradiation device.

FIG. 3 is a cross-sectional view illustrating a comparative example of a light irradiation device. A light irradiation device 3000 according to a comparative example includes an LED board 301 as a light-source board, on which an LED is mounted as the light emitting element, a light guide member 302, an opposing reflector 303, holding members 304, 305, and 306 holding the LED board 301, the light guide member 302, and the opposing reflector 303, and fastening members 307 and 308 fastening the LED board 301, the light guide member 302, and the opposing reflector 303. The LED board (hereinafter, simply referred to as a "board") 301 is secured on the holding member 304 by the fastening member 307.

The light guide member 302 includes a projection 302*a* which is integrally formed with the light guide member 302, and the projection 302*a* fits into the hole provided on the holding member 304, and thus, the projection 302*a* is positioned. By fastening the fastening member 308, the light guide member 302 is pressed by a projection 305*a* disposed on the holding member 305, and is secured with respect to the board 301 and the holding member 304. A light-irradiation optical system including the board 301, the light guide member 302, and the holding members 304 and 305 is fastened and secured with respect to the holding member 306 by the fastening member 308.

Figure 4:
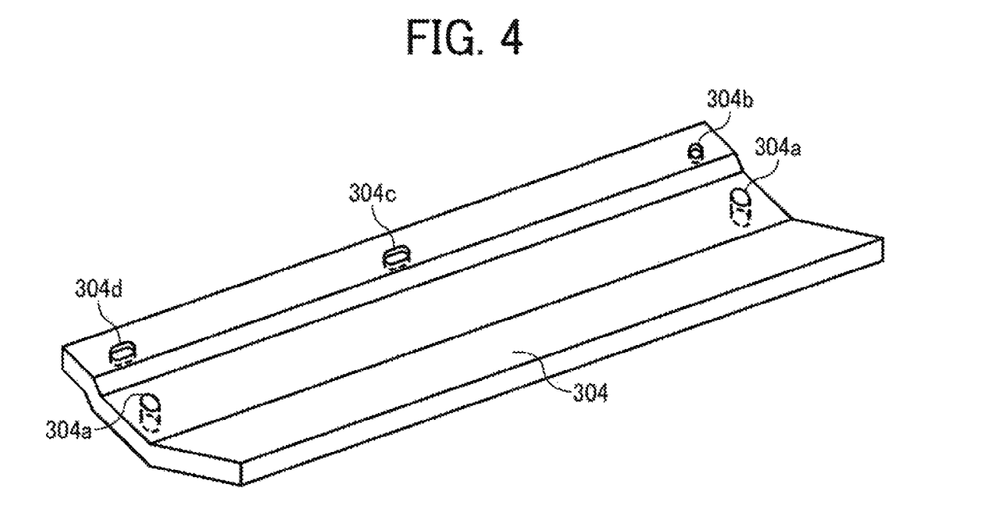
FIG. 4 is a perspective view illustrating an example of a holding member of a light irradiation device of the comparative example.

FIG. 4 is a perspective view illustrating an example of the holding member 304 of the light irradiation device 3000 of the comparative example. The holding member 304 includes a plurality of holes 304*a*, 304*b*, 304*c*, and 304*d*.

Among the holes 304*a*, 304*b*, 304*c*, and 304*d*, the hole 304*a* is a through-hole to which the fastening member 307 for fastening the board 301 is inserted. The holes 304*b*, 304*c*, and 304*d* are through-holes into which a plurality of projections 302*a* on the light guide member 302 respectively fit. Among the holes 304*a*, 304*b*, 304*c*, and 304*d*, the projection 302*a* fits into the hole 304*b* of which an opening shape is a substantially circular shape, and thus, the light guide member 302 is positioned in a horizontal direction. Rotation around the hole 304*b* is restricted by the projections 302*a* fitting into the holes 304*d* and 304*c* of which an opening shape is a substantially elliptic shape.

The light guide member 302 is usually molded by using a transparent resin material, and may be deformed by heat. For this reason, as with the example of FIG. 4, it is preferable that the holes other than the hole 304*b* for positioning have a substantially elliptic shape having a long axis in a longitudinal direction (the main scanning direction).

The light guide member usually contains a transparent material, in particular, a resin material such as PMMA, polycarbonate (PC), and a cycloolefin polymer (COP), and is generally manufactured by injection molding which is excellent in productivity. In a case where an elongated flat plate-like light guide member is manufactured by injection molding, the light guide member is easily warped due to a residual stress of a resin or a temperature difference of a metal mold. FIG. 5 is a diagram schematically illustrating a light guide member 302*e* in a state of being warped.

Figure 5:
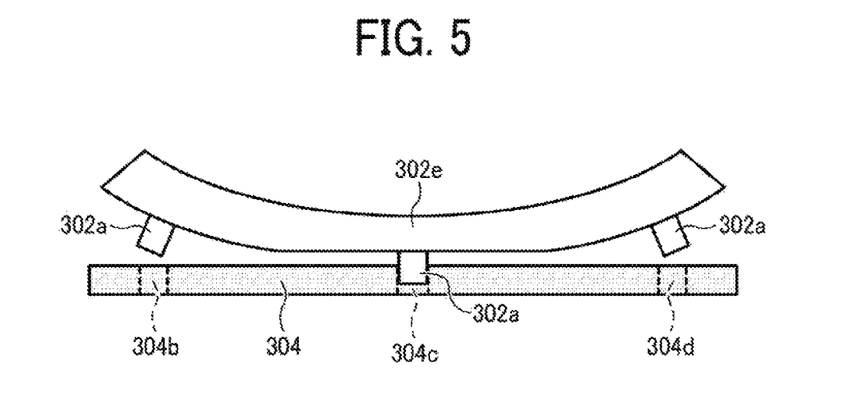
FIG. 5 is a schematic view illustrating a state in which a light guide of the light irradiation device of the comparative example is warped.

As illustrated in FIG. 5, in the light guide member 302*e* which is warped such that both end portions of the light guide member 302*e* in the main scanning direction float, it is difficult to fit all of the projections 302*a* into the holes 304*b*, 304*c*, and 304*d* of the holding member without applying a load to the light guide. For example, in an assembly operation, when the light guide member 302*e* which is warped and the holding member 304 are assembled in the holding member 305, both ends of the light guide member 302*e* in the main scanning direction float, and thus, it is extremely difficult to assemble the light guide member 302*e* and the holding member 304 without a unit pressing the light guide member 302*e* and the holding member 304.

On the other hand, in a case where the light guide member 302e and the holding member 304 are assembled by using a jig or the like pressing the light guide member 302e and the holding member 304, it is required to provide a cutout, a hole, or the like on the holding member 305 not to be in contact with the jig. There is a possibility that light is leaked from the formed cutout or the hole according to the portion, and thus, stray light may be generated or a user may feel discomfort. A countermeasure of such problems causes a cost increase.

In contrast, the light guide member of the light irradiation device according to the present embodiment includes securing type securing structures different from each other in both end portions in the main scanning direction, which are out of the light guide area. The securing structure in one end portion is the engagement lug structure protruding to penetrate into the through-hole on the holding member, including the lug on the leading end, and engaging the holding member, and the securing structure in the other end portion is the fastening structure including the fastening hole penetrating into the fastening member and being secured on the holding member through the fastening member. The light guide member is secured on the holding member by the lug and the fastening member, and the floating of the light guide member is pressed. Therefore, the assembly is easily performed, and the securement can be performed with high positional accuracy.

The securing structure is formed in the end portion in the main scanning direction, and thus, it is possible to prevent a metal mold structure used at the time of manufacturing the light guide member from being complicated. For example, in a configuration where the engagement lug structure is formed in a portion other than the end portion, the engagement lug structure becomes an undercut with respect to the metal mold, but it is possible to prevent the engagement lug structure from being the undercut by forming the engagement lug structure in the end portion.

Figure 16:
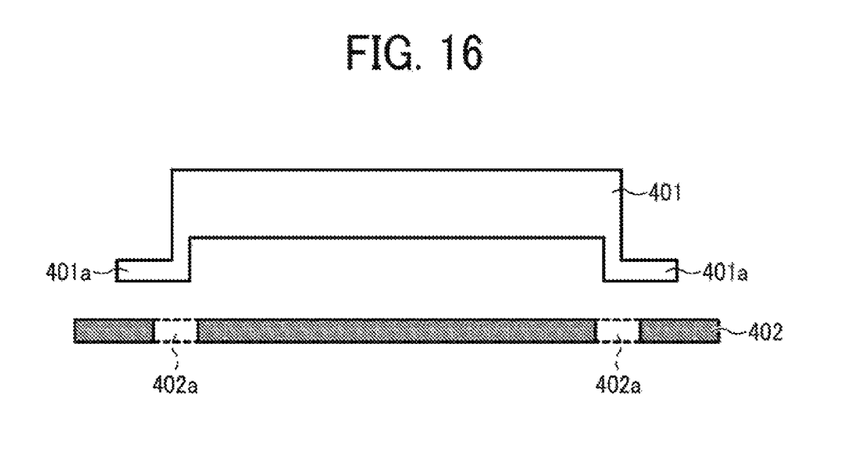
FIG. 16 is a schematic side view of an example of the secure structure of the light guide in each member.

In a case where the light guide member, which is an elongated member including a resin material, is secured in both ends, a structure capable of absorbing thermal expansion is required. In a case where both of the securing structures in both ends are set to the fastening structure, it is not possible to release the thermal expansion, and there is a concern that a stress is concentrated on the center portion and the light guide member is deformed or broken. In contrast, in a case where both of the securing structures in both ends are set to the engagement lug structure, it is possible to release the thermal expansion. However, as illustrated in FIG. 16, a length of a light guide member 401 and lugs 401a in both ends is longer than a length between holes 402a on a holding member 402 into which the lug penetrates, and thus, it is required to deform (curve) the light guide member 401 at the time of the assembly operation, and there is a concern that the light guide member 401 is broken. For this reason, it is preferable that one end portion is set to the engagement lug structure, and the other end portion is set to the fastening structure.

Engagement Lug Structure

Figure 6:
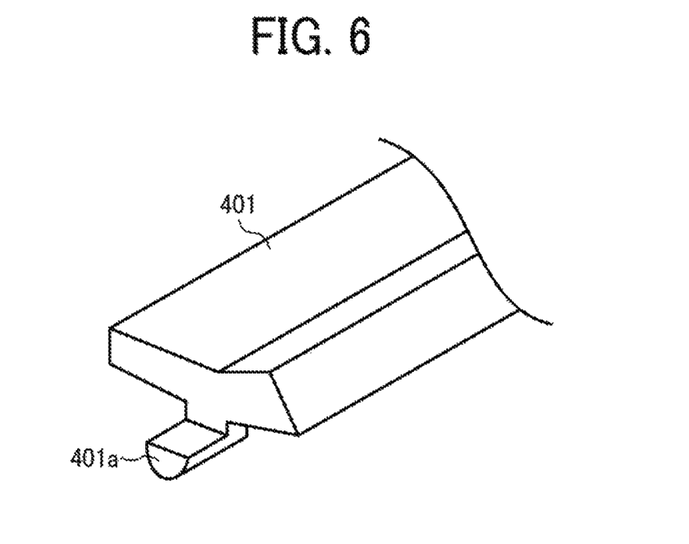
FIG. 6 is a perspective view illustrating an example of a secure structure of the light guide.
Figure 7:
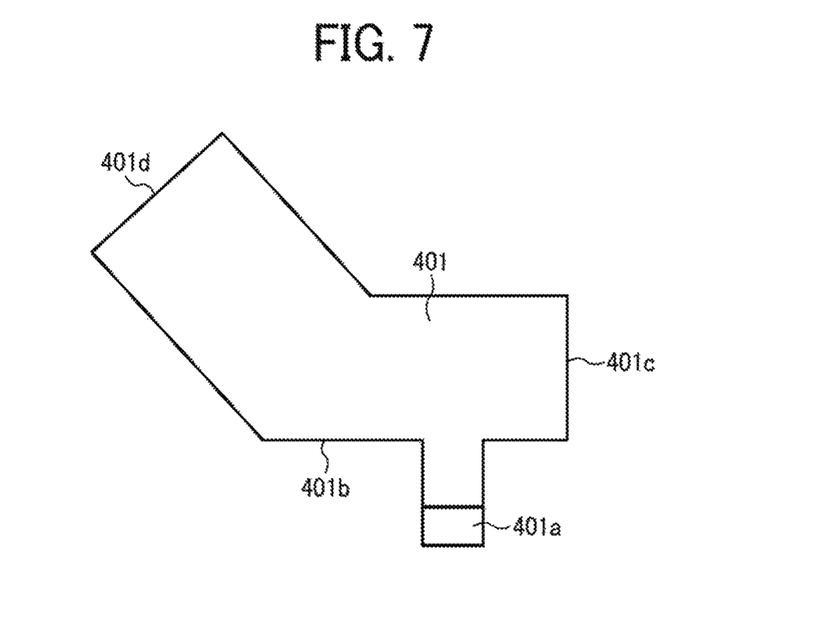
FIG. 7 is a schematic side view of an example of the secure structure of the light guide.

The engagement lug structure will be described with reference to FIG. 6 and FIG. 7. FIG. 6 is a perspective view of the engagement lug structure. As illustrated in FIG. 6, the engagement lug structure includes the lug 401a engaging the holding member, which is formed toward the end portion side of the light guide member 401 in the main scanning direction. FIG. 7 is a schematic side view (a schematic cross-sectional view) of the engagement lug structure. A cross-sectional shape of the light guide member 401 body is not limited to the drawing. The light guide member 401 includes an incident surface 401c, an exit surface 401d, and a held surface 401b, and the lug 401a has a structure protruding to a lower portion from the held surface 401b on a lower end.

Figure 8:
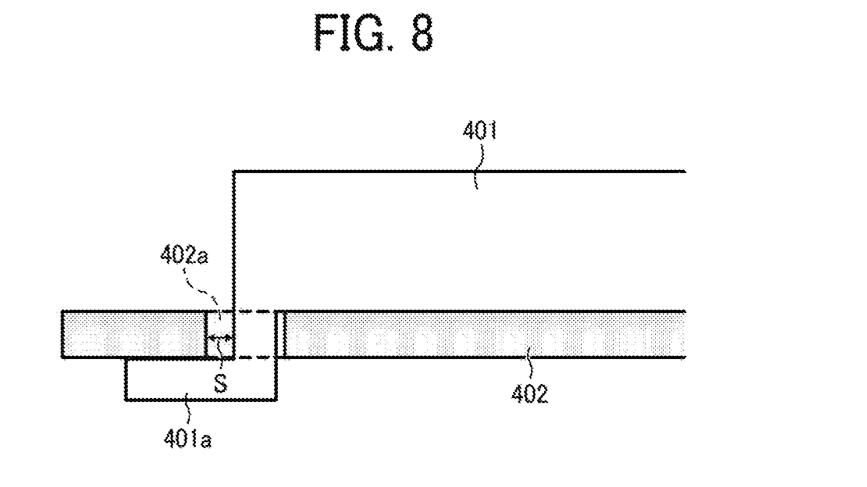
FIG. 8 is a schematic illustration of the securement of the secure structure of the light guide.

FIG. 8 is a schematic cross-sectional view of the securement of the engagement lug structure with respect to the holding member. The holding member 402 is a sheet-metal thin flat plate member, and includes the hole 402a. The lug 401a of the light guide member penetrates into the hole 402a, the lug 401a, which is formed to be entangled with the holding member, engages with the hole 402a, and thus, the deformation of the light guide member 401 is restricted. As indicated by arrow S in the drawing, it is preferable that the hole 402a has a space on the end portion side. The space S is provided on the end portion side, and thus, even in a case where the light guide member 401 is deformed by the thermal expansion or the like, it is possible to absorb a deformation amount.

Fastening Structure

Figure 9:
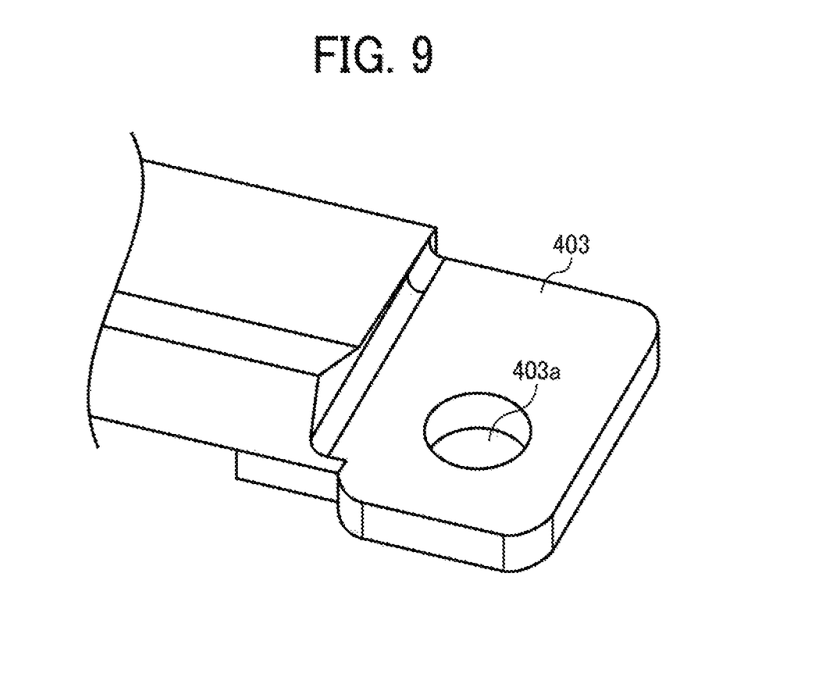
FIG. 9 is a perspective view illustrating an example of the secure structure of the light guide.
Figures 10, 11:
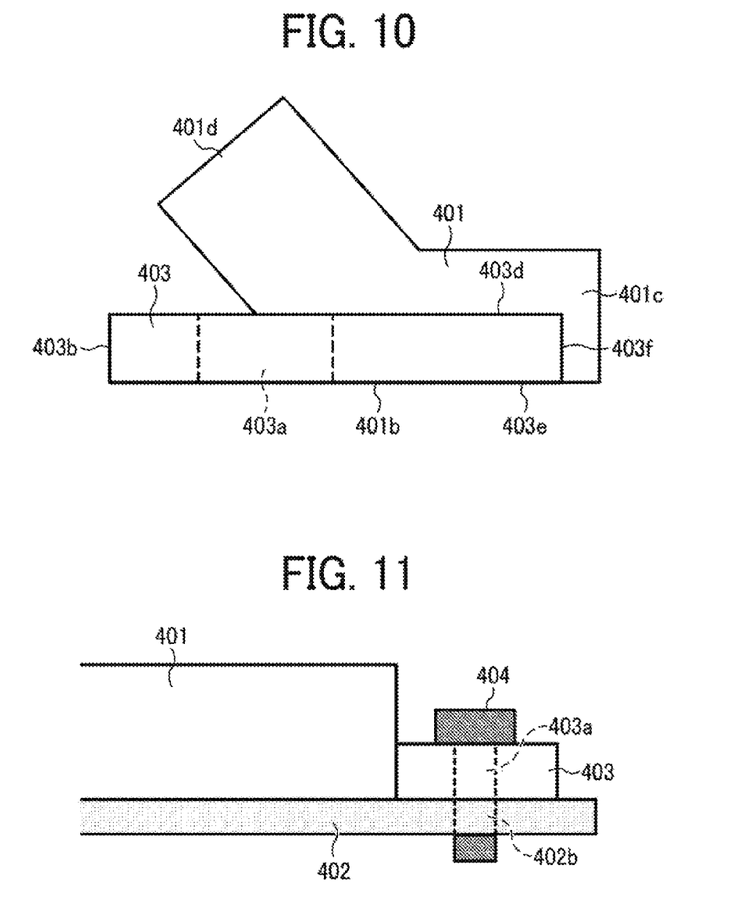
FIG. 10 is a schematic side view of an example of the secure structure of the light guide.
FIG. 11 is a schematic side view of an example of a securing method of the secure structure of the light guide.

The fastening structure will be described with reference to FIG. 9 and FIG. 10. FIG. 9 is a perspective view of the fastening structure. As illustrated in FIG. 9, the fastening structure has a substantially rectangular parallelepiped shape, and includes a fastening hole 403a penetrating into the fastening member (screw). The light guide member is secured on the holding member through the fastening member. FIG. 10 is a schematic side view (a schematic cross-sectional view) of the fastening structure. A cross-sectional shape of the light guide member 401 body is not limited to the drawing. The light guide member 401 includes the incident surface 401c, the exit surface 401d, and the held surface 401b, and the fastening structure 403 also includes a holding surface 403e which is the same flat surface as the held surface 401b of the light guide member. The surface 403d which is in contact with a seating surface of the fastening member, is parallel to the holding surface 403e. A side surface 403b is a side surface on the exit surface side of the light guide member 401, and a side surface 403f is a side surface on the incident surface side of the light guide member 401.

FIG. 11 is a schematic cross-sectional view of the securement of the fastening structure with respect to the holding member. The holding member 402 includes a hole 402b, a fastening member 404 penetrates into the fastening hole 403a of the fastening structure and the hole 402b of the holding member, and thus, the fastening structure 403 and the holding member 402 are fastened together. In this embodiment, the fastening member 404 is illustrated as a screw, but is not limited to the screw, and for example, may be a rivet or the like.

Thus, the engagement lug structure is provided in one end, and the fastening structure is provided in the other end, and thus, the light guide member 401 is secured on the holding member 402. Therefore, it is possible to reduce the floating of both end portions in the main scanning direction due to the warp of the light guide member 401, and to easily perform the assembly with high positional accuracy without using a jig or the like.

According to the configuration described above, a light guide member molded by injection molding can be applied to the light guide member 401. The light guide member 401 is manufactured by the injection molding excellent in productivity by using a transparent resin as a material, and thus, it is possible to attain a cost reduction.

First Embodiment

Figure 12:
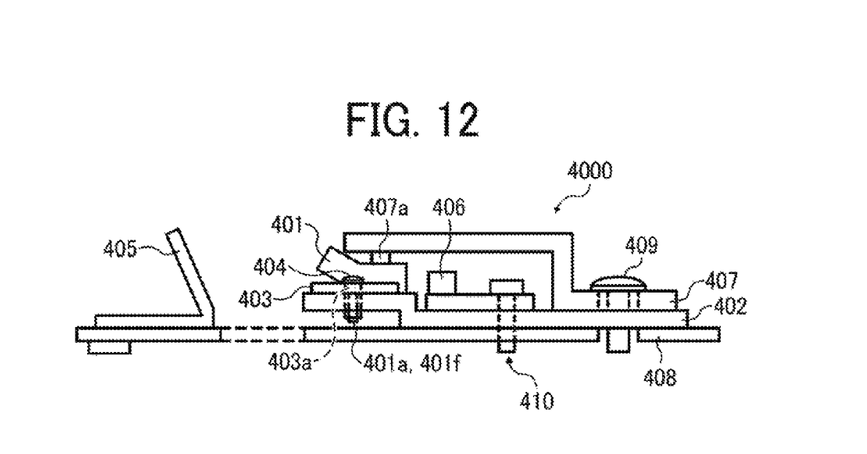
FIG. 12 is a cross-sectional view illustrating an example of the light irradiation device.

FIG. 12 illustrates a cross-sectional view of a light irradiation device as a first embodiment of the present disclosure. A light irradiation device 4000 according to the first embodiment includes an LED board 406 as a light-source board on which an LED is mounted as a light emitting element, the light guide member 401, an opposing reflector 405, holding members 402, 407, and 408 holding the LED board 406, the light guide member 401, and the opposing reflector 405, and fastening members 409 and 410 fastening the LED board 406, the light guide member 401, and the opposing reflector 405. The LED board (hereinafter, simply referred to as a "board") 406 is secured on the holding member 402 by the fastening member 410.

The light guide member 401 includes the securing structure in each of both end portions in the main scanning direction, which are out of the light guide area. The securing structure in one end portion is the engagement lug structure protruding to penetrate into the through-hole on the holding member 402, including the lug 401a on the leading end, and engaging the holding member 402, and the securing structure in the other end portion is the fastening structure including the fastening hole 403a penetrating into a fastening member 404 and being secured on the holding member 402 through the fastening member 404.

The light guide member further includes a projection structure 401f which fits into the hole on the holding member 402. The projection structure 401f is a projection structure which is different from the lug 401a and does not have a structure formed to be entangled with the holding member 402. It is preferable that a plurality of (two or more) projection structures 401f are provided in the main scanning direction.

Figure 15:
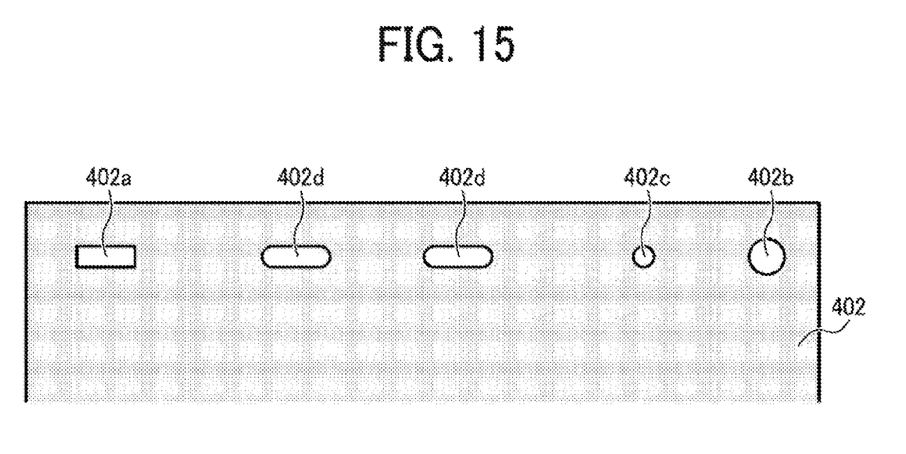
FIG. 15 is a schematic view of a holding member of the light irradiation device.

Here, referring to FIG. 15, the hole of the holding member will be described. The hole 402a is a through-hole engaging a lug 401a of the engagement lug structure of the light guide member. The hole 402b is a through-hole for fastening the light guide member 401 and the holding member 402 together by the fastening member 404 penetrating into the fastening hole 403a on the fastening structure, and as required, burring or screw tap cutting is performed.

As described above, the light guide member 401 includes the plurality of projection structures 401f arrayed in the main scanning direction on the held surface 401b, and the holding member 402 includes a plurality of holes 402c and 402d which fit into the projection structures 401f. As illustrated in FIG. 15, among the plurality of holes, the hole 402c fitting the projection structure 401f that is closest to the fastening structure 403 has a substantially circular opening shape, and the other hole 402d has a substantially elliptic opening shape having a longer axis in the main scanning direction than in a direction perpendicular to the main scanning direction.

The projection structure 401f is used in the positioning between the light guide member 401 and the holding member 402. As with the comparative example illustrated in FIG. 4, it is preferable that among the plurality of holes, one hole is a hole of which an opening for positioning has a substantially circular shape, and the other hole has a substantially elliptic shape having a long axis in the longitudinal direction (the main scanning direction). In a case where the light guide member 401 thermally expands, an expansion amount increases in a position separated from the fastening structure 403 secured by a strong fastening force, and thus, a structure is preferable in which an opening shape is a substantially elliptic shape, and thus, the deformation due to expansion is released. In an example of FIG. 15, an opening shape of the hole 402d is a substantially elliptic shape.

In the light irradiation device 4000 illustrated in FIG. 12, the holding member 407 includes a projection 407a, and the light guide member 401 is pressed and secured on the holding member 402 by the projection 407a. The projection 407a may have a function of pressing the light guide member 401 on the holding member 402, may be a separated member which is not integrated with the holding member 407, and for example, may be a flat spring, a coil spring, or the like.

Second Embodiment

Figure 13:
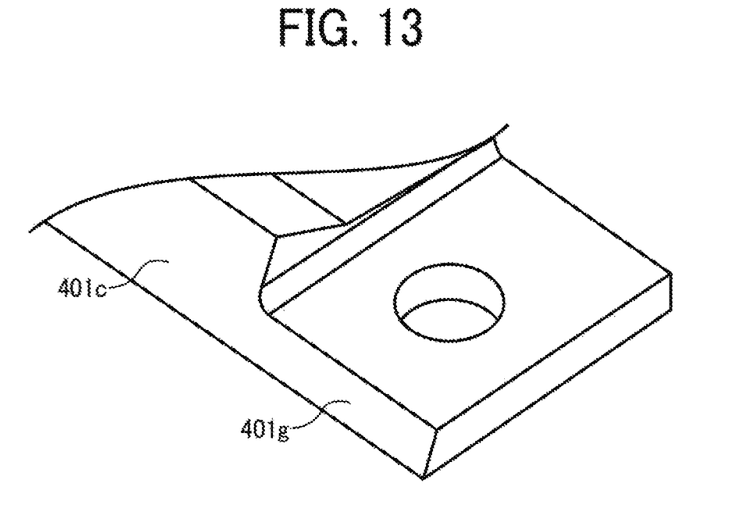
FIG. 13 is a perspective view illustrating an example of the secure structure of the light guide.

A second embodiment of the present disclosure will be described with reference to FIG. 13. In the light irradiation device 4000 of this embodiment, in the light guide member 401, at least any one of the incident surface 401c and the exit surface 401d is a light diffusion surface having a structure of diffusing light, and any one side surface of the fastening structure 403 including a flat surface continuous with the light diffusion surface is also a light diffusion surface. FIG. 13 illustrates an example in which a side surface 401g of the fastening structure which is continuous with the incident surface 401c is a light diffusion surface, and the side surface 401g has a light diffusion structure.

The fastening structure 403 is integrated with the light guide member 401, and thus, a part of light penetrating into the light guide member 401 proceeds to the fastening structure 403 side. For this reason, it is possible to visually observe light of the light source (the LED) from the fastening structure 403 side, and thus, user may feel discomfort due to glare. A possibility of enabling the light source to be directly visually observed from a surface of the fastening structure 403 (in an example of FIG. 10, the side surface 403b) opposing the incident surface 401c of the light guide member 401 is high. From the viewpoint of ensuring safety, a structure is preferable in which the user is not able to directly visually observe the light from the light source.

Therefore, at least any one of the incident surface 401c and the exit surface 401d of the light guide member 401 has the structure of diffusing light, and thus, the light of the light source is prevented from being directly visually observed. From the viewpoint of preventing the loss of light at the time of being transmitted through the light guide member 401, it is preferable that the light diffusion structure is provided in the exit surface 401d.

The light diffusion surface, for example, can be obtained by transferring the light diffusion structure onto a desired side surface by using a metal mold piece having the light diffusion structure. Examples of the light diffusion structure include a surface subjected to surface texturing, a surface subjected to sandblasting, or the like, having fine asperities. A microlens array may be used as fine asperities. Each microlens has a random shape, and thus, it is possible to prevent a reading error such as moire. As illustrated in FIG. 13, the structure is provided in which the side surface of the fastening structure 403 is the same flat surface as the incident surface 401c and the exit surface 401d, and thus, it is possible to set the number of metal mold pieces required to transferring the light diffusion structure to one, and to attain a cost reduction.

Third Embodiment

Figure 14:
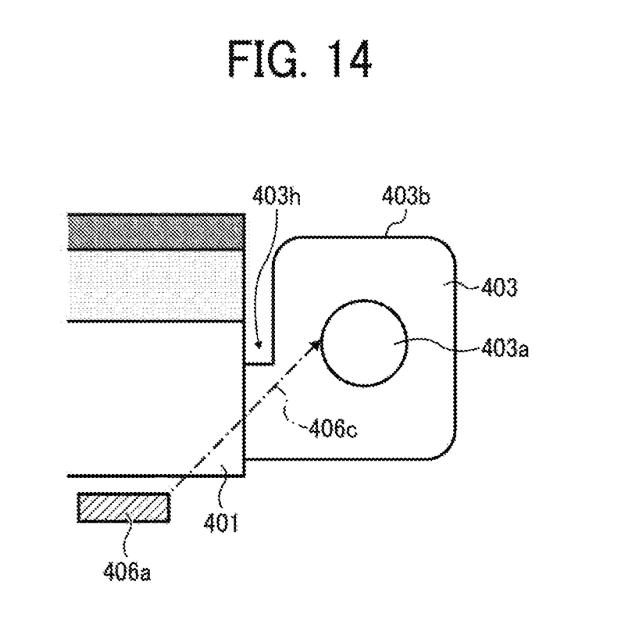
FIG. 14 is a schematic view illustrating an example of the secure structure of the light guide.

A third embodiment of the present disclosure will be described with reference to FIG. 14. In the light irradiation device 4000 of this embodiment, in the light guide member 401, at least any one of the incident surface side and the exit surface side has a cutout structure on a connecting portion between the light guide area and the securing structure. In FIG. 14, an aspect is illustrated in which the cutout structure is provided on the connecting portion between the light guide area of the light guide member 401 and the fastening structure 403.

Examples of a method of preventing the light of the light source (the LED) from being visually observed from the fastening structure 403 side include a method of providing the cutout structure on the connecting portion between the light guide area of the light guide member 401 and the fastening structure 403, as with this embodiment. A light source 406a illustrated in FIG. 14 is an LED which is closest to the fastening structure 403, and a light path 406c illustrated by an arrow of a broken line is a light path of a light ray directed toward the fastening structure 403 from the light source 406a passing the cutout structure 403h. The light ray falls into the fastening hole 403a, and does not reach the side surface 403b of the fastening structure. A part of the light ray is reflected on the fastening hole 403a, and the reflection occurs due to a recessed surface, and thus, the reflection light is diffused. For this reason, the light of the light source is not directly visually observed, and thus, it is possible to prevent the user from feeling discomfort due to the glare, and to ensure the safety.

The cutout structure 403h is provided, and thus, a part of the light from the light source is totally reflected on the cutout structure 403h, the light intensity directed toward the fastening structure 403 decreases, and the light intensity directed toward the irradiation area increases. Therefore, it is also possible to increase the illuminance of the end portion.

Numerous additional modifications and variations are possible in light of the above teachings. It is therefore to be understood that, within the scope of the above teachings, the embodiments of the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

What is claimed is:

1. A light irradiation device comprising:
   a light source that is an elongated light source or a plurality of light emitting elements linearly arranged in a main scanning direction on a board;
   a light guide member including a transparent material to guide light from the light source; and
   a holding member to hold the light source and the light guide member,
   the light guide member including:
      an incident surface on which the light exiting from the light source is incident, the incident surface having an elongated shape in the main scanning direction and being disposed to face a light emitting surface of the light source;
      an exit surface from which the light incident from the incident surface is to exit toward an irradiation area of an irradiation target;
      a held surface disposed in contact with the holding member to be pressed against and secured to the holding member;
      end portions in the main scanning direction, which are out of a light guide area of the light guide member;
   a first securing structure at one of the end portions in the main scanning direction, which are out of a light guide area of the light guide member, the first securing structure being an engagement lug structure protruding to penetrate into a through-hole of the holding member, including a lug on a leading end, and engaging the holding member; and
   a second securing structure at another of the end portions in the main scanning direction, the second securing structure being a fastening structure having a fastening hole penetrated with a fastening member and being secured to the holding member with the fastening member.

2. The light irradiation device according to claim 1, wherein at least any one of the incident surface and the exit surface of the light guide member is a first light diffusion surface including a structure to diffuse light, and
wherein a side surface of the fastening structure includes a flat surface continuous with the first light diffusion surface is a second light diffusion surface including a structure to diffuse light.

3. The light irradiation device according to claim 1, wherein the light guide member has a cutout structure on a connecting portion between a light guide area and both the first securing structure and the second securing structure on at least one side of the incident surface and the exit surface.

4. The light irradiation device according to claim 1, wherein the light guide member includes a plurality of projection structures arrayed in the main scanning direction on the held surface,
wherein the holding member has a plurality of holes fitting the plurality of projection structures, and
wherein, of the plurality of holes, a hole fitting a projection structure of the plurality of projection structures that is closest to the fastening structure of the light guide member has a substantially circular opening shape, and another hole has a substantially elliptic opening shape being longer in the main scanning direction than in a direction perpendicular to the main scanning direction.

5. The light irradiation device according to claim 1, wherein the light guide member is a member molded by injection molding.

6. An image reading device comprising:
the light irradiation device according to claim 1 to irradiate an irradiation target with light; and
an image pick-up element to convert a light intensity of reflection light from the irradiation target into an image signal to read an image of the irradiation target.

7. An image forming apparatus comprising:
the image reading device according to claim 6; and
an image forming unit to form, on a medium, the image read by the image reading device.

* * * * *